(12) United States Patent
Tanaka

(10) Patent No.: US 12,326,346 B2
(45) Date of Patent: Jun. 10, 2025

(54) APPARATUS, METHOD, AND COMPUTER PROGRAM FOR COLLECTING FEATURE DATA

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 17/865,934

(22) Filed: Jul. 15, 2022

(65) Prior Publication Data

US 2023/0027195 A1    Jan. 26, 2023

(30) Foreign Application Priority Data

Jul. 20, 2021 (JP) .................................. 2021-119674

(51) Int. Cl.
*G01C 21/00* (2006.01)
*G01C 21/34* (2006.01)

(52) U.S. Cl.
CPC ..... *G01C 21/3889* (2020.08); *G01C 21/3461* (2013.01); *G01C 21/3848* (2020.08); *G01C 21/3896* (2020.08)

(58) Field of Classification Search
CPC ............ G01C 21/3815; G01C 21/28; G01C 21/3804; G01C 21/3848; G01C 21/3889; G01C 21/3896; G01C 21/3461
See application file for complete search history.

(56) References Cited

U.S. PATENT DOCUMENTS

| 11,835,343 | B1 * | 12/2023 | Ebrahimi Afrouzi ....................... G05D 1/0272 |
| 2008/0033645 | A1 * | 2/2008 | Levinson ................ G01S 19/49 701/469 |
| 2008/0240505 | A1 | 10/2008 | Nakamura et al. |
| 2008/0240573 | A1 | 10/2008 | Nakamura et al. |
| 2016/0003972 | A1 * | 1/2016 | Angermann ........... G05B 15/02 702/5 |
| 2017/0332198 | A1 * | 11/2017 | Dannenbring ..... G01C 21/3841 |

(Continued)

FOREIGN PATENT DOCUMENTS

| JP | 2008-249479 A | 10/2008 |
| JP | 2008-250687 A | 10/2008 |

(Continued)

*Primary Examiner* — Wilson W Tsui
(74) *Attorney, Agent, or Firm* — Sughrue Mion, PLLC

(57) ABSTRACT

An apparatus for collecting feature data includes a memory configured to store map information including a probability distribution of reliability indicating how likely a feature related to travel of vehicles exists as a function of position; and one or more processors configured to store feature data indicating the position of the feature in the memory whenever receiving the feature data from any of one or more vehicles via a communication circuit, update the probability distribution of reliability indicating how likely the feature exists as a function of position, based on the position of the feature indicated by each of one or more pieces of received feature data, and transmit an instruction to stop collecting the feature data to the one or more vehicles via the communication circuit for a feature regarding which the extent of the updated probability distribution is not greater than a predetermined threshold.

2 Claims, 7 Drawing Sheets

(56) References Cited

U.S. PATENT DOCUMENTS

| | | | |
|---|---|---|---|
| 2020/0005635 A1* | 1/2020 | Nagata | G01S 19/49 |
| 2020/0114923 A1* | 4/2020 | Kato | B60W 40/02 |
| 2020/0249670 A1 | 8/2020 | Takemura et al. | |
| 2020/0355513 A1* | 11/2020 | Ma | G01C 21/367 |
| 2021/0108943 A1* | 4/2021 | Liang | H04L 67/52 |
| 2021/0156698 A1* | 5/2021 | Koda | G09B 29/10 |
| 2021/0180981 A1 | 6/2021 | Matsumoto et al. | |
| 2022/0397420 A1* | 12/2022 | Williamson | G01C 21/3837 |

FOREIGN PATENT DOCUMENTS

| | | |
|---|---|---|
| JP | 2016-014647 A | 1/2016 |
| JP | 2020-038362 A | 3/2020 |
| WO | 2018/180097 A1 | 10/2018 |

* cited by examiner

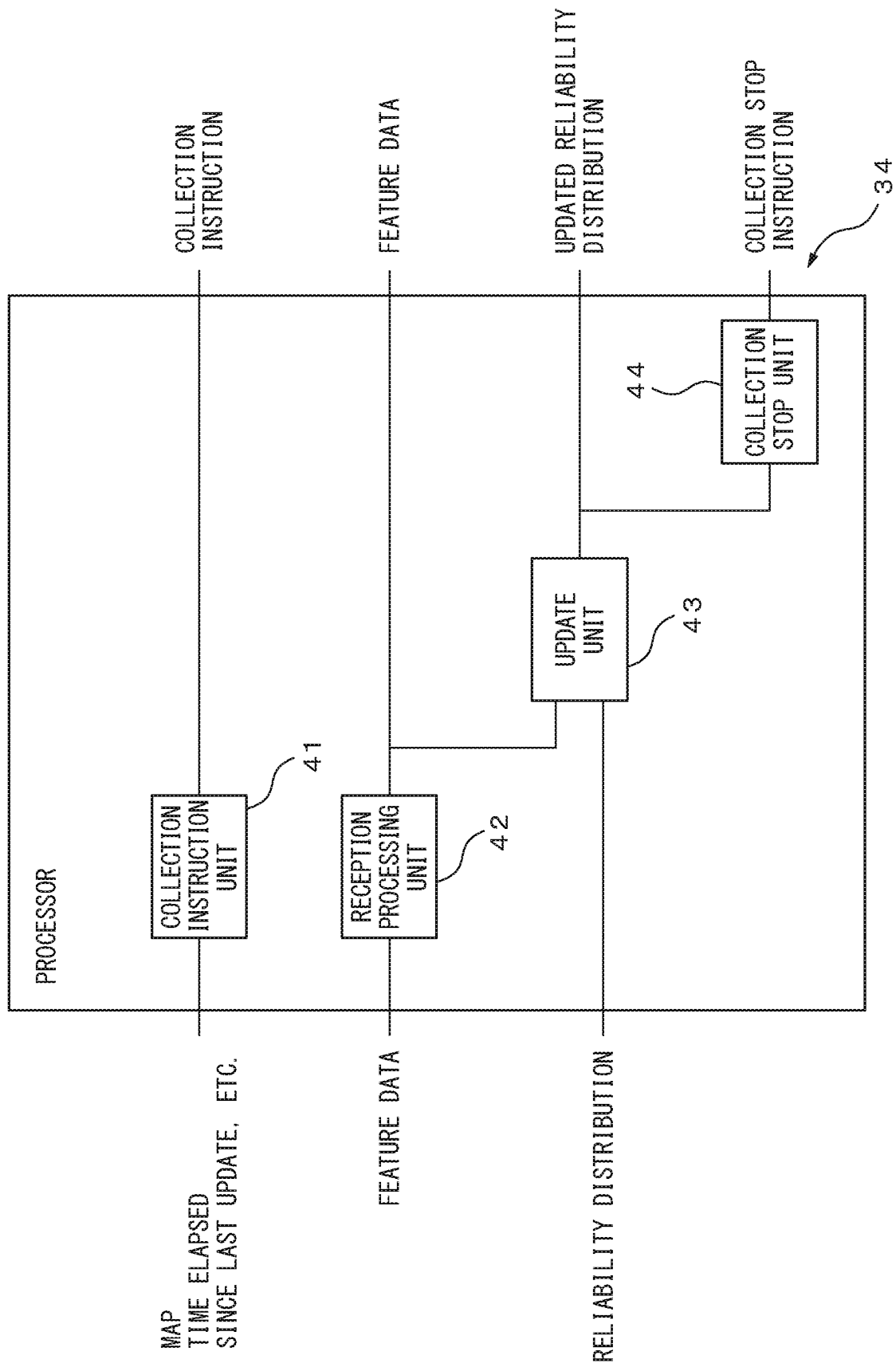

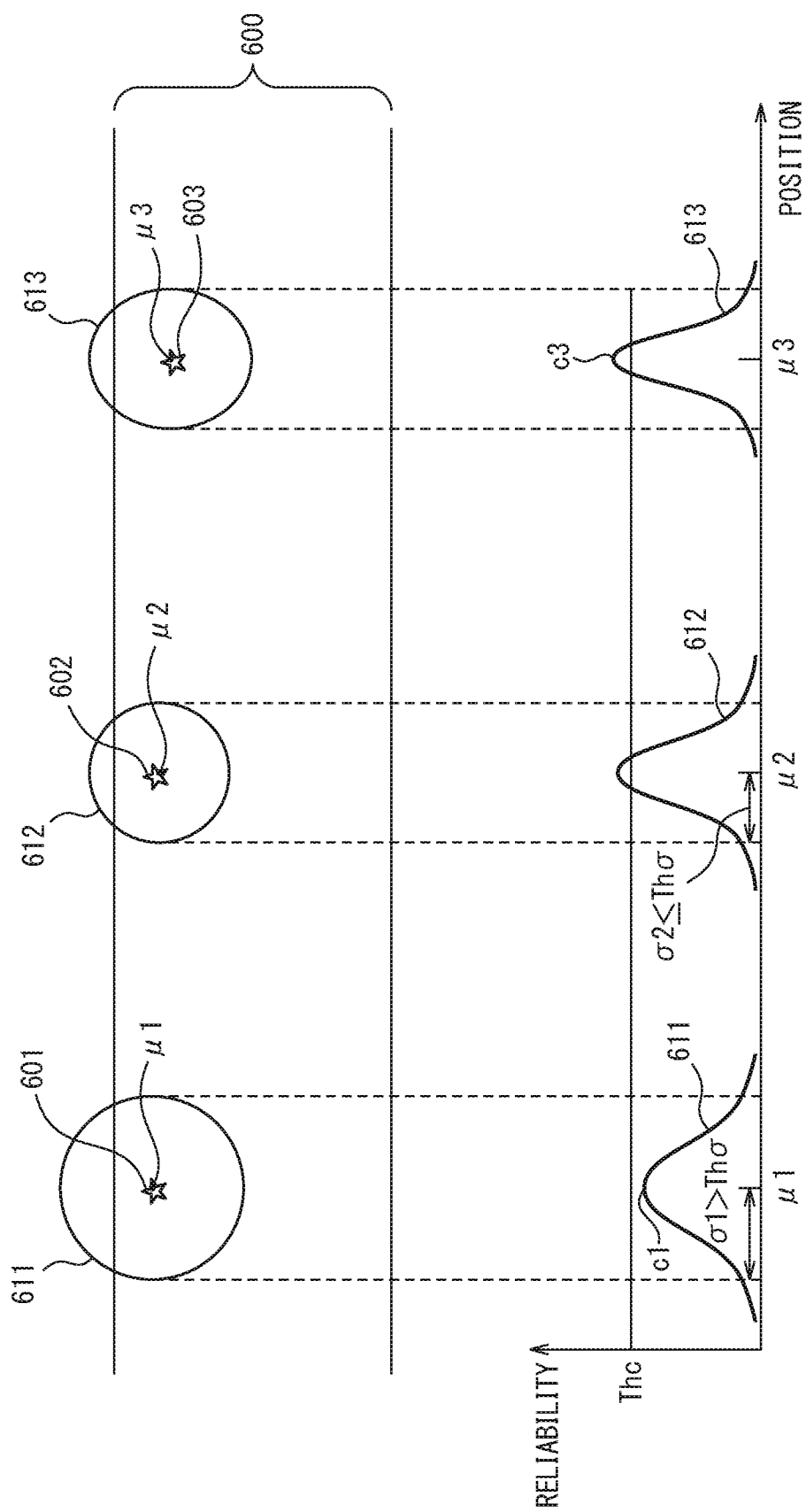

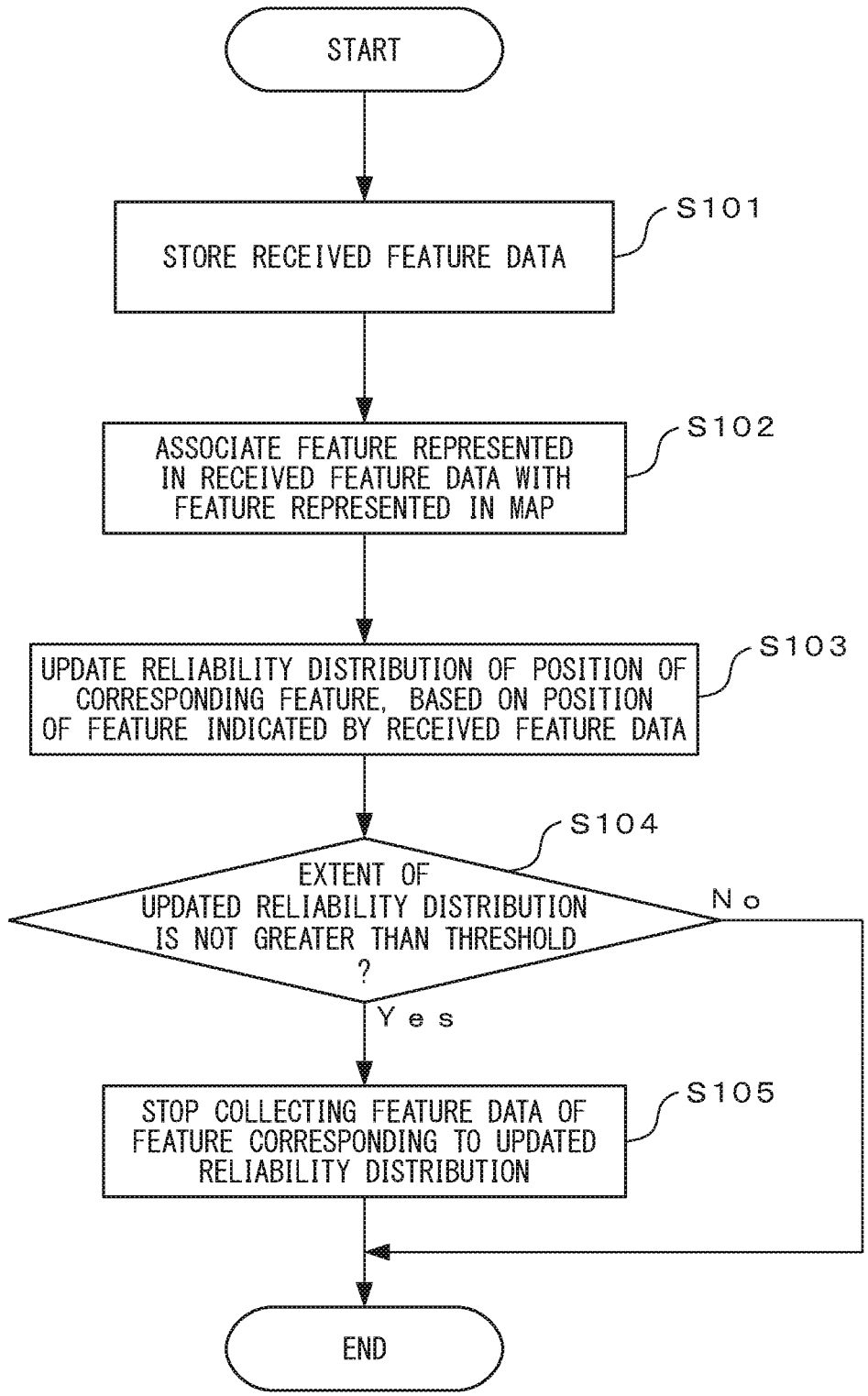

APPARATUS, METHOD, AND COMPUTER PROGRAM FOR COLLECTING FEATURE DATA

FIELD

The present invention relates to an apparatus, a method, and a computer program for collecting data of features represented in a map.

BACKGROUND

High-precision maps to which an autonomous vehicle-driving system refers for autonomous driving control of a vehicle are required to accurately represent information on features on or around roads which relate to travel of vehicles. Thus, data representing those features is collected from vehicles actually traveling on roads. A technique for reducing the communication load of this collection between the vehicles and a device that collects data representing features has been proposed (see International Publication No. 2018/180097).

In the technique disclosed in International Publication No. 2018/180097, a server device receives information indicating the situation of autonomous driving from a first moving object capable of autonomous driving based on the state of its surroundings and a map. The server device then transmits a request for state information, which indicates the state of the location to which the first moving object has moved, to a second moving object capable of transmitting the state information, and stops transmitting the request when the received situation information indicates that autonomous driving is possible.

SUMMARY

To update a map so as to ensure precision of the position of each feature represented in the map, it is desirable to collect, for each feature, at least a certain number of pieces of data representing the feature. However, the collection speed of feature-representing data may vary from feature to feature, depending on the frequency of passage of vehicles or the collection environment of individual places. Additionally, the number of pieces of feature-representing data required to achieve sufficient positional accuracy may vary from feature to feature because the positional accuracy of each feature included in the feature-representing data is not uniform. For these reasons, it is difficult to appropriately set timing for finishing collecting data representing a feature on a feature-by-feature basis.

It is an object of the present invention to provide an apparatus for collecting feature data that can appropriately set timing for stopping collecting data representing a feature on a feature-by-feature basis.

According to an embodiment, an apparatus for collecting feature data is provided. The apparatus includes a memory configured to store map information including a probability distribution of reliability indicating how likely a feature related to travel of vehicles exists as a function of position; and one or more processors configured to: store feature data indicating the position of the feature in the memory whenever receiving the feature data from any of one or more vehicles via a communication circuit capable of communicating with the vehicles, update the probability distribution indicating how likely the feature exists as a function of position, based on the position of the feature indicated by each of one or more pieces of received feature data, and transmit an instruction to stop collecting the feature data to the one or more vehicles via the communication circuit when the extent of the updated probability distribution is not greater than a predetermined threshold.

The feature data preferably further includes information indicating the distance between a vehicle of the one or more vehicles that has generated the feature data and the position of the feature indicated by the feature data; and the one or more processors of the apparatus preferably increase contribution of the feature data to update of the probability distribution as the distance decreases.

The probability distribution is preferably expressed as a normal distribution; and when a variance value in any direction of the updated probability distribution is equal to or less than a predetermined variance threshold, the one or more processors of the apparatus preferably determine that the extent of the updated probability distribution is not greater than the predetermined threshold.

Alternatively, the probability distribution is preferably expressed as a normal distribution; and when reliability at an average position in the updated probability distribution is not less than a predetermined reliability threshold, the one or more processors of the apparatus preferably determine that the extent of the updated probability distribution is not greater than the predetermined threshold.

According to another embodiment, a method for collecting feature data is provided. The method includes storing feature data indicating the position of a feature related to travel of vehicles in a memory whenever receiving the feature data from any of one or more vehicles via a communication circuit capable of communicating with the vehicles; updating a probability distribution of reliability indicating how likely the feature exists as a function of position, based on the position of the feature indicated by each of one or more pieces of received feature data, the probability distribution being included in map information; and transmitting an instruction to stop collecting the feature data to the one or more vehicles via the communication circuit when the extent of the updated probability distribution is not greater than a predetermined threshold.

According to still another embodiment, a non-transitory recording medium that stores a computer program for collecting feature data is provided. The computer program includes instructions causing a computer to execute a process including storing feature data indicating the position of a feature related to travel of vehicles in a memory whenever receiving the feature data from any of one or more vehicles via a communication circuit capable of communicating with the vehicles; updating a probability distribution of reliability indicating how likely the feature exists as a function of position, based on the position of the feature indicated by each of one or more pieces of received feature data, the probability distribution being included in map information; and transmitting an instruction to stop collecting the feature data to the one or more vehicles via the communication circuit when the extent of the updated probability distribution is not greater than a predetermined threshold.

The apparatus according to the present invention has an advantageous effect of being able to appropriately set timing for stopping collecting data representing a feature on a feature-by-feature basis.

BRIEF DESCRIPTION OF DRAWINGS

FIG. 5 is a functional block diagram of a processor of the server, related to a feature data collection process.

FIG. 6 schematically illustrates reliability distributions of the positions of features.

FIG. 7 is an operation flowchart of the feature data collection process.

DESCRIPTION OF EMBODIMENTS

An apparatus for collecting feature data, a method for collecting feature data, and a computer program for collecting feature data executed by the apparatus will now be described with reference to the attached drawings. Regarding a predetermined region, the apparatus collects data representing a feature related to travel of vehicles (hereafter, "feature data") from one or more vehicles that can communicate to the apparatus.

The apparatus uses a probability distribution of reliability indicating how likely a feature exists as a function of position (hereafter, a "reliability distribution") to represent the position of the feature. The apparatus updates the reliability distribution of each feature, using the positions of the feature indicated by feature data received for the feature, and stops collecting feature data for a feature regarding which the extent of the reliability distribution is not greater than a predetermined threshold.

Features to be detected include various signposts, various road markings, traffic lights, and other features related to travel of vehicles.

Figure 1:
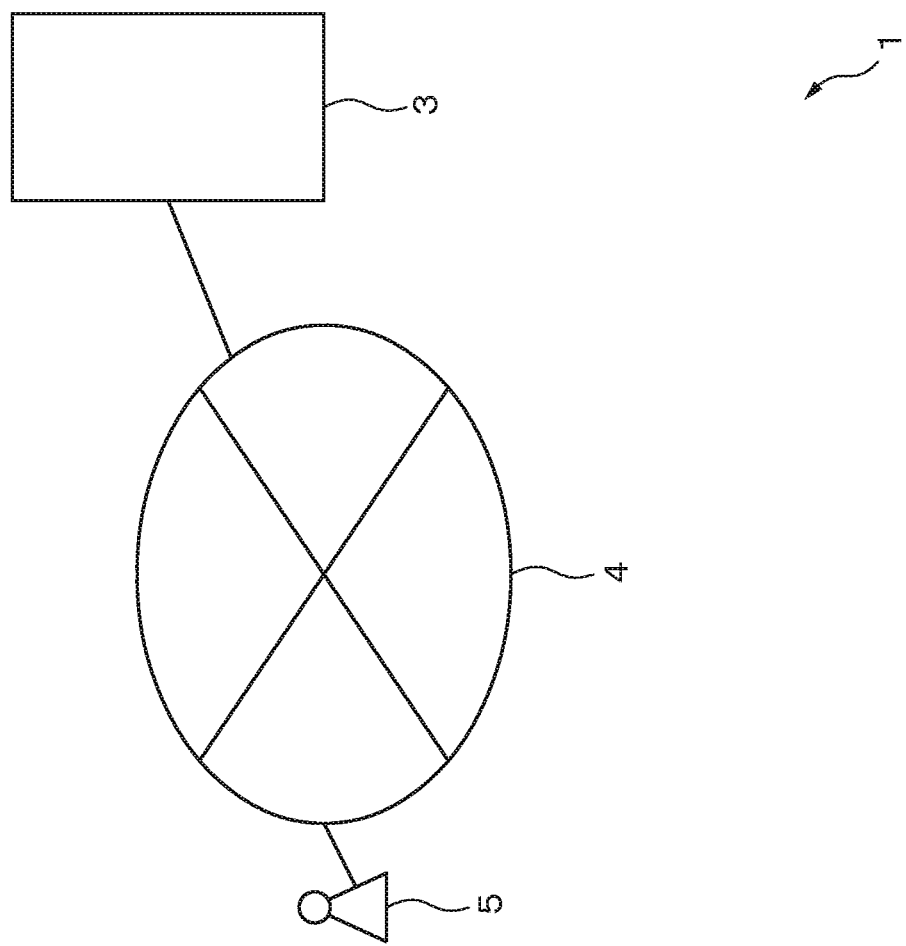
FIG. 1 schematically illustrates the configuration of a system for collecting feature data equipped with an apparatus for collecting feature data.
Figure 1:
Figure 1:
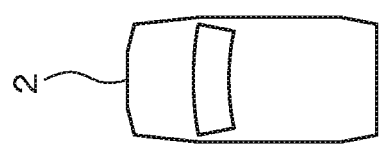

FIG. 1 schematically illustrates the configuration of a system for collecting feature data equipped with the apparatus for collecting feature data. In the present embodiment, the system 1 for collecting feature data includes at least one vehicle 2 and a server 3, which is an example of the apparatus for collecting feature data. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2, but the system 1 may include multiple vehicles 2. FIG. 1 also illustrates only a single wireless base station 5, but the communication network 4 may be connected with multiple wireless base stations 5. Additionally, the server 3 may be connected to a traffic information server (not illustrated) that manages traffic information so that they can communicate via the communication network.

Figure 2:
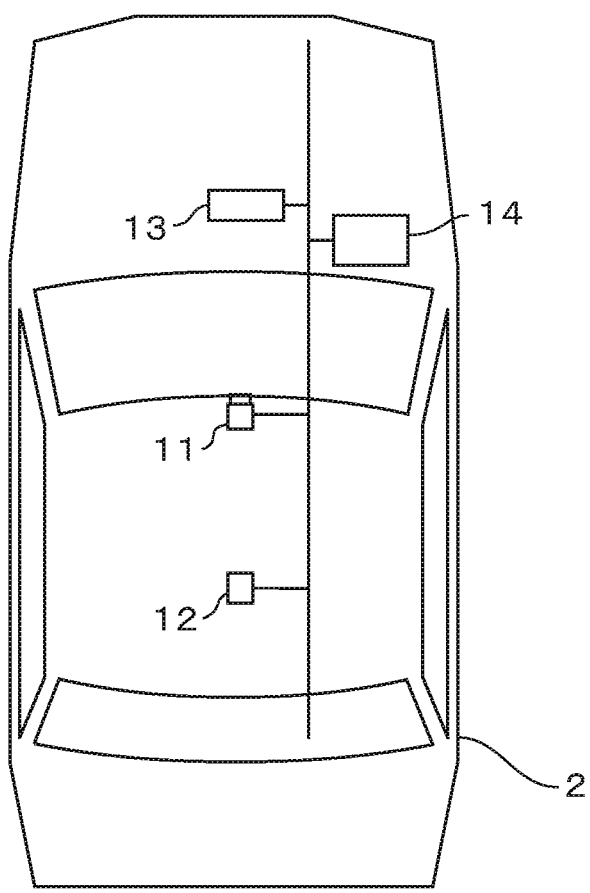
FIG. 2 schematically illustrates the configuration of a vehicle.

FIG. 2 schematically illustrates the configuration of the vehicle 2. The vehicle 2 includes a camera 11, a GPS receiver 12, a wireless communication terminal 13, and a data acquisition device 14, which are connected so that they can communicate via an in-vehicle network conforming to a standard, such as a controller area network. The vehicle 2 may further include a navigation device (not illustrated) for searching for a planned travel route of the vehicle 2 and for navigating so that the vehicle 2 may travel along the planned travel route.

The camera 11, which is an example of an image capturing unit for capturing the surroundings of the vehicle 2, includes a two-dimensional detector constructed from an array of optoelectronic transducers, such as CCD or C-MOS, having sensitivity to visible light and a focusing optical system that forms an image of a target region on the two-dimensional detector. The camera 11 is mounted, for example, in the interior of the vehicle 2 so as to be oriented, for example, to the front of the vehicle 2. The camera 11 captures a region in front of the vehicle 2 every predetermined capturing period (e.g., $\frac{1}{30}$ to $\frac{1}{10}$ seconds), and generates images of this region. The images obtained by the camera 11 may be color or grayscale images. The vehicle 2 may include multiple cameras 11 whose imaging directions or focal lengths differ.

Whenever generating an image, the camera 11 outputs the generated image to the data acquisition device 14 via the in-vehicle network.

The GPS receiver 12 receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 14 via the in-vehicle network at predetermined intervals. The vehicle 2 may include a receiver conforming to a satellite positioning system other than the GPS receiver 12. In this case, this receiver determines the position of the vehicle 2.

The wireless communication terminal 13, which is an example of a communication unit, is a device to execute a wireless communication process conforming to a predetermined standard of wireless communication, and accesses, for example, the wireless base station 5 to connect to the server 3 via the wireless base station 5 and the communication network 4. The wireless communication terminal 13 generates an uplink radio signal including, for example, feature data received from the data acquisition device 14, and transmits the uplink radio signal to the wireless base station 5 to transmit, for example, the feature data and travel information to the server 3. Additionally, the wireless communication terminal 13 receives a downlink radio signal from the wireless base station 5, and passes, for example, a collection instruction or a collection stop instruction from the server 3 included in the radio signal to the data acquisition device 14 or to an electronic control unit (ECU) (not illustrated) that controls travel of the vehicle 2.

Figure 3:
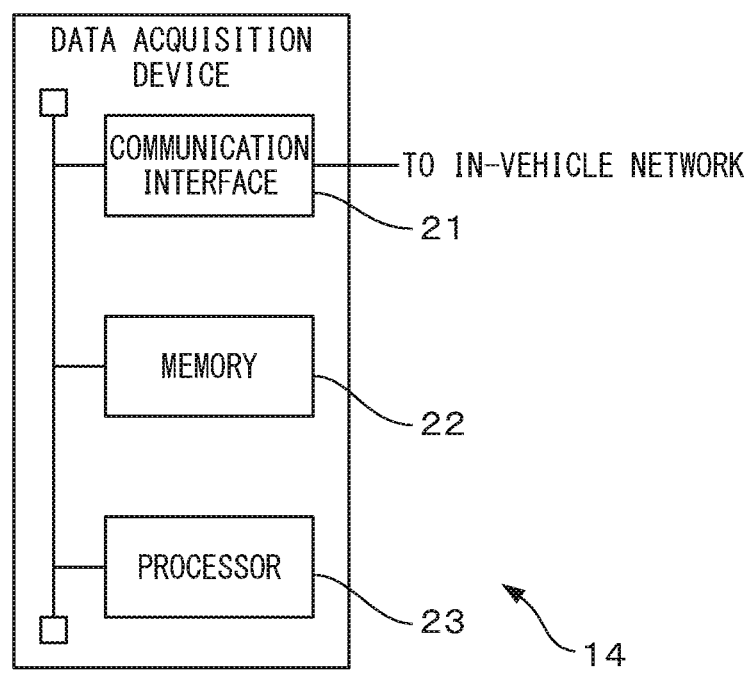
FIG. 3 illustrates the hardware configuration of a data acquisition device.

FIG. 3 illustrates the hardware configuration of the data acquisition device. The data acquisition device 14 generates feature data, based on an image generated by the camera 11, and further generates travel information of the vehicle 2. To achieve this, the data acquisition device 14 includes a communication interface 21, a memory 22, and a processor 23.

The communication interface 21, which is an example of an in-vehicle communication unit, includes an interface circuit for connecting the data acquisition device 14 to the in-vehicle network. In other words, the communication interface 21 is connected to the camera 11, the GPS receiver 12, and the wireless communication terminal 13 via the in-vehicle network. Whenever receiving an image from the camera 11, the communication interface 21 passes the received image to the processor 23. Whenever receiving positioning information from the GPS receiver 12, the communication interface 21 passes the received positioning information to the processor 23. Additionally, the communication interface 21 passes to the processor 23 a collection instruction and a collection stop instruction about feature data received from the server 3 via the wireless communication terminal 13. Additionally, the communication interface 21 outputs feature data received from the processor 23 to the wireless communication terminal 13 via the in-vehicle network.

The memory 22 includes, for example, volatile and nonvolatile semiconductor memories. The memory 22 may further include other storage, such as a hard disk drive. The memory 22 stores various types of data used in a process related to generation of feature data, which is executed by the processor 23 of the data acquisition device 14. Such data includes, for example, a road map; identifying information of the vehicle 2; parameters of the camera 11, such as the height of the mounted position, the imaging direction, and the angle of view of the camera 11; and a set of parameters for defining a classifier for detecting a feature from an image. The road map may be, for example, a map used by the navigation device, and includes information on the positions and the lengths of road sections included in the region represented in the road map as well as the connection relationship between road sections at individual intersections in this region. The memory 22 may also store images received from the camera 11 and positioning information received from the GPS receiver 12 for a certain period. Additionally, the memory 22 stores information indicating a target region for generating and collecting feature data (hereafter, a "collection target region") specified in a collection instruction to collect feature data as well as information indicating a region regarding which collection of feature data is stopped (hereafter, a "collection stop region") specified in a collection stop instruction. The memory 22 may further store computer programs for various processes executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11 and positioning information received from the GPS receiver 12 in the memory 22. Additionally, the processor 23 executes the process related to generation of feature data at predetermined intervals (e.g., 0.1 to 10 seconds) during travel of the vehicle 2.

As the process related to generation of feature data, for example, the processor 23 determines whether the position of the vehicle 2 indicated by positioning information received from the GPS receiver 12 is within a collection target region. When the position of the vehicle is within a collection target region, the processor 23 generates feature data, based on an image received from the camera 11.

For example, the processor 23 inputs an image received from the camera 11 into a classifier that has been trained to detect a detection target feature, thereby detecting the feature represented in the inputted image (hereafter simply the "input image"). The processor 23 generates information indicating the type of the detected feature as feature data. As such a classifier, the processor 23 may use, for example, a deep neural network (DNN) that has been trained to detect from an input image the feature represented in the image. As such a DNN, for example, a DNN having a convolutional neural network (CNN) architecture, e.g., Single Shot MultiBox Detector (SSD) or Faster R-CNN, is used. In this case, for each type of detection target feature (e.g., a lane-dividing line, a pedestrian crossing, and a stop line), the classifier calculates a confidence score indicating how likely the feature is represented in a region in the input image; the classifier calculates the confidence score for each of various regions in the input image. The classifier determines that the region where the confidence score for a certain type of feature is not less than a predetermined detection threshold represents this type of feature. The classifier then outputs information indicating a region including a detection target feature in the input image, e.g., a circumscribed rectangle of the detection target feature (hereafter, an "object region") and information indicating the type of the feature represented in the object region. The processor 23 generates feature data so as to include the information indicating the type of the feature represented in the detected object region.

Additionally, the processor 23 identifies the real-space position of a feature indicated by feature data, and includes information indicating the position in the feature data. Positions of pixels in an image correspond one-to-one to the directions from the camera 11 to objects represented in the respective pixels. Thus the processor 23 estimates the position of a feature represented in an object region detected from the image, based on the direction from the camera 11 to the position corresponding to the centroid of the object region, the position and the travel direction of the vehicle 2 at the time of generation of the image used for generating the feature data, and the parameters of the camera 11, such as the imaging direction, the angle of view, and the height of the mounted position. To this end, the processor 23 can use the position indicated by positioning information received from the GPS receiver 12 at the timing closest to the time of generation of the image used for generating the feature data as the position of the vehicle 2. Alternatively, in the case that the ECU (not illustrated) estimates the position of the vehicle 2, the processor 23 may obtain information indicating the estimated position of the vehicle 2 from the ECU via the communication interface 21. The processor 23 further obtains information indicating the travel direction of the vehicle 2 from the ECU (not illustrated). Alternatively, the processor 23 may estimate the position of a feature indicated by feature data by "structure from motion (SfM)." In this case, the processor 23 associates object regions representing the same feature in two images obtained at different timings with each other, using optical flow. The processor 23 can estimate the position of the feature by triangulation, based on the positions and the travel directions of the vehicle 2 at the times of acquisition of the two images, the parameters of the camera 11, and the positions of the object regions in the respective images.

The processor 23 includes, in feature data, the latitude and longitude indicating the position of the feature represented in the feature data as information indicating the position of the feature represented in the feature data. Additionally, the processor 23 refers to the road map to identify a link that is a road section including the position of the feature represented in the feature data or a road section closest to this position. The processor 23 then includes the identification number of the identified link in the feature data.

The processor 23 may further include the identifying information of the vehicle 2 in the feature data. The processor 23 may also include, in the feature data, information used for estimating the position of the feature, e.g., the parameters of the camera 11 and the position of the feature in the image. Additionally, the processor 23 may include, in the feature data, the position and the travel direction of the vehicle 2 at the time of generation of the feature data, which are used for estimating the position of the feature, as well as the intensity of received GPS signals used for determining the position of the vehicle 2. Whenever generating feature data, the processor 23 outputs the generated feature data to the wireless communication terminal 13 via the communication interface 21. In this way, feature data is transmitted to the server 3. The processor 23 may transmit the information used for estimating the position of the feature to the server 3 via the wireless communication terminal 13 together with the identifying information of the vehicle 2 separately from the feature data.

According to a modified example, the processor 23 may use an image itself generated by the camera 11 (hereafter, a "whole image") or a sub-image obtained by cutting out a region representing a road surface from a whole image as feature data. In this case also, the processor 23 may include the position and the travel direction of the vehicle 2 at the time of generation of the feature data and the parameters of the camera 11 in the feature data so that the server 3 can detect the position of a feature from the whole image or the sub-image.

When the position of a detected feature is within a collection stop region specified in a collection stop instruction received from the server 3, the processor 23 does not generate feature data of the feature regardless of whether the position of the feature is within a collection target region.

The following describes the server 3, which is an example of the apparatus for collecting feature data.

Figure 4:
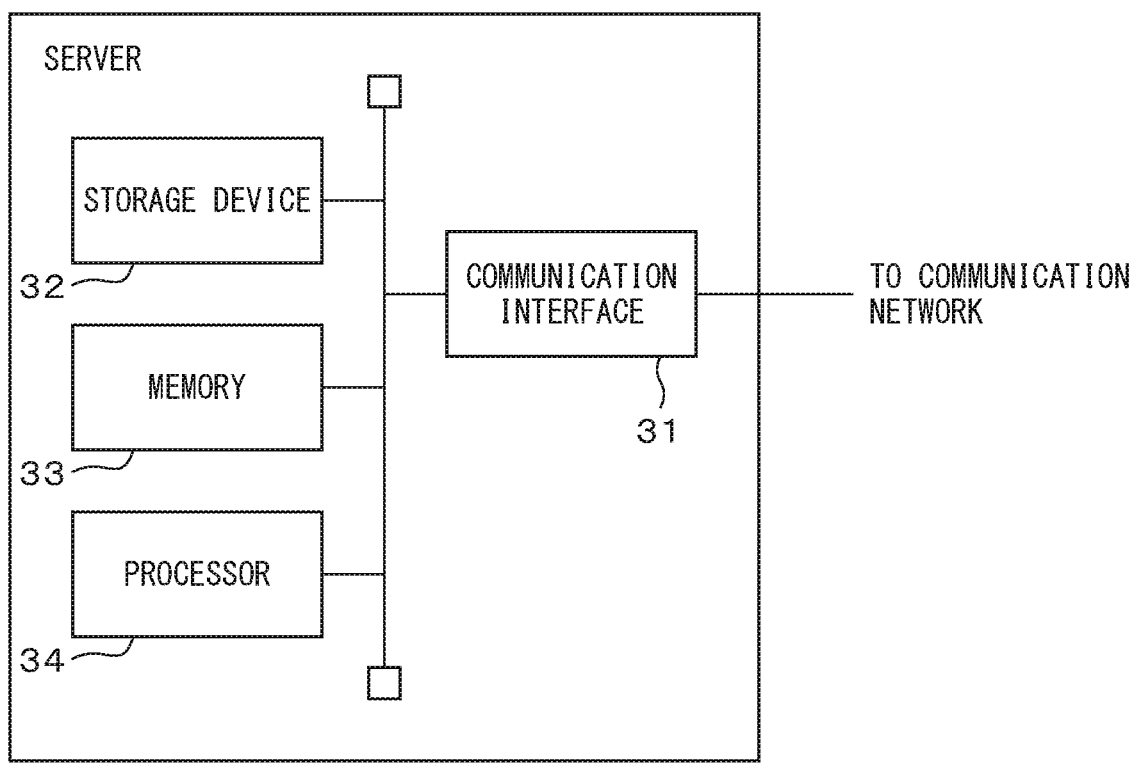
FIG. 4 illustrates the hardware configuration of a server, which is an example of the apparatus for collecting feature data.

FIG. 4 illustrates the hardware configuration of the server 3, which is an example of the apparatus for collecting feature data. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of the communication unit, includes an interface circuit for connecting the server 3 to the communication network 4. The communication interface 31 is configured so that the server 3 can communicate with the vehicle 2 via the communication network 4 and the wireless base station 5. More specifically, the communication interface 31 passes to the processor 34 feature data received from the vehicle 2 via the wireless base station 5 and the communication network 4. Additionally, the communication interface 31 transmits a collection instruction and a collection stop instruction received from the processor 34 to the vehicle 2 via the communication network 4 and the wireless base station 5.

The storage device 32, which is an example of the storage unit, includes, for example, a hard disk drive, or an optical recording medium and an access device therefor. The storage device 32 stores various types of data and information used in a process for collecting map data. For example, the storage device 32 stores a map to be generated or updated, the reliability distributions of the positions of features represented in the map, and the identifying information of each vehicle 2. The map to be generated or updated is an example of map information including a reliability distribution of the position of each feature. The storage device 32 further stores feature data received from each vehicle 2. The storage device 32 may further store a computer program executed by the processor 34 for executing a feature data collection process.

The memory 33, which is another example of the storage unit, includes, for example, nonvolatile and volatile semiconductor memories. The memory 33 temporarily stores various types of data generated during execution of the feature data collection process.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 executes the feature data collection process.

FIG. 5 is a functional block diagram of the processor 34, related to the feature data collection process. The processor 34 includes a collection instruction unit 41, a reception processing unit 42, an update unit 43, and a collection stop unit 44. These units included in the processor 34 are functional modules, for example, implemented by a computer program executed by the processor 34, or may be dedicated operating circuits provided in the processor 34.

The collection instruction unit 41 generates a collection instruction to instruct the vehicle 2 to collect feature data of a feature in a collection target region. Each collection target region may be, for example, one of regions of predetermined lengths (e.g., several dozen to hundred meters) set by dividing the whole region represented in the map to be generated or updated into a grid. However, each collection target region is not limited to this example, and may be set so that its area decreases as the density of roads in the region increases. Alternatively, each collection target region may be set so that its area decreases as the density of a particular structure of roads (e.g., intersections or junctions) in the region increases. Alternatively, each collection target region may be set so as to include a single road section or intersection. For example, when a map is newly generated, the collection instruction unit 41 sets each of multiple regions represented in the map as a collection target region. Alternatively, of multiple regions represented in the map to be updated, the collection instruction unit 41 may set a region where a predetermined period has elapsed since the last update as a collection target region. Alternatively, the collection instruction unit 41 may set a collection target region according to that information inputted with the input device which specifies the collection target region. Further, when receiving construction information indicating the location where construction was performed from the traffic information server, the collection instruction unit 41 may set a region including the location of the construction as a collection target region.

The collection instruction unit 41 generates a collection instruction including information for identifying the collection target region, and transmits the generated collection instruction to the vehicle 2 via the communication interface 31.

The reception processing unit 42 stores feature data in the memory 33 or the storage device 32 whenever receiving the feature data from the vehicle 2 via the wireless base station 5, the communication network 4, and the communication interface 31. Additionally, the reception processing unit 42 passes the received feature data to the update unit 43.

The update unit 43 updates the reliability distribution of the position of each feature in the collection target region, based on the position of the feature indicated by each of one or more pieces of received feature data. The update unit 43 may execute an update process described below whenever receiving feature data or two or more predetermined number of pieces of feature data.

In the present embodiment, the probability distribution of reliability of the position of a feature may be a two-dimensional normal distribution along a road surface. Alternatively, the reliability distribution may be a three-dimensional normal distribution. As described above, the reliability distribution indicates how likely a feature exists as a function of position.

The update unit 43 associates the feature represented in the received feature data with one of the features represented in the map. Specifically, for each feature represented in the map and located in the collection target region including the position of the feature represented in the feature data, the update unit 43 calculates the distance from the position where the reliability of the feature represented in the map is highest, i.e., the position of the average of the reliability distribution, to the position of the feature represented in the feature data. This distance may be expressed as a Mahalanobis distance. The update unit 43 then associates the feature represented in the feature data with one of the features represented in the map whose calculated distance is shortest and not greater than a predetermined distance threshold and whose type is the same as that of the feature represented in the feature data.

Regarding a feature represented in the map and associated with the feature represented in the received feature data, the update unit 43 applies maximum likelihood estimation to the positions of the feature included in the received feature data and the previously collected feature data to update the reliability distribution of the position of the feature represented in the map. Thus the reliability distribution is updated so that the reliability of the position indicated by the received feature data will increase.

Alternatively, the update unit 43 may use Bayesian updating to update the reliability distribution of the position of the feature represented in the map and associated with the feature represented in the received feature data. In this case, the area where the feature represented in the map and associated with the feature represented in the received feature data may exist is divided in advance into grid-like divisions. For each division, reliability indicating how likely the feature is located there is set according to the reliability distribution before the update. As initial values of the reliability, the same reliability may be set for each division, or higher reliability may be set for a division where the feature is more likely to exist. When receiving feature data, the update unit 43 updates the reliability of each division so that the reliability of the division including the position of the feature indicated by the received feature data will increase. Alternatively, the update unit 43 may update the reliability of each division so that the reliability of divisions within a predetermined area around the position of the feature indicated by the received feature data will increase. To this end, the update unit 43 may set a higher rate of increase in reliability to a division closer to the position of the feature. Alternatively, for each division, the update unit 43 may set a probability distribution centered at the division and having a variance-covariance matrix of the probability distribution before the update. For each division, the update unit 43 may calculate a posteriori probability that the feature exists in the division for the position of the feature indicated by the received feature data, based on the probability distribution of the division, and use the posteriori probability as the reliability of the division after the update (i.e., the priori probability of the division at the next update). The update unit 43 then approximates the reliability of each division with a normal distribution to calculate an updated reliability distribution of the position of the feature. In this case, since the feature data used for updating the reliability distribution may be discarded, the update unit 43 can simplify management of feature data and reduce the amount of memory for storing feature data.

Alternatively, for each feature, the update unit 43 may set multiple candidates for the reliability distribution of the position of the feature. In this case, each candidate may be a normal distribution represented by an average position and a variance-covariance matrix. When receiving feature data, the update unit 43 calculates the posteriori probability of each candidate, for the position of the feature indicated by the received feature data, and use the posteriori probability as the priori probability of each candidate at the next update. The update unit 43 determines the normal distribution corresponding to the candidate whose priori probability is highest as the reliability distribution of the position of the feature. In this case also, the update unit 43 can simplify management of feature data and reduce the amount of memory for storing feature data.

Alternatively, the update unit 43 may update the reliability distributions of features of the same type included in each collection target region on a collection target region by collection target region basis. In this case, a mixture normal distribution including the reliability distributions of features of the same type is defined. The update unit 43 applies an algorithm of expected value maximization to the positions of the feature indicated by the received feature data and the previously collected feature data of the collection target region to update the defined mixture normal distribution. In this way, the reliability distribution of each feature included in the updated mixture normal distribution is updated. According to this modified example, the update unit 43 can update the reliability distribution of the position of each feature appropriately even when there is difficulty in association of the feature represented in received feature data, e.g., when there are multiple features of the same type close together in the collection target region.

For each feature whose positional reliability distribution has been updated, the update unit 43 notifies the collection stop unit 44 of the updated reliability distribution and stores the updated reliability distribution in the storage device 32.

The collection stop unit 44 determines whether to stop collecting feature data, for each feature whose positional reliability distribution has been updated, according to the extent of the reliability distribution.

As described above, the positional reliability distribution is defined by an average position and a variance-covariance matrix when the positional reliability distribution is expressed as a normal distribution. The higher the reliability at the average position or the smaller the values of the elements of the variance-covariance matrix, the smaller the extent of the reliability distribution. Additionally, the smaller the extent of the reliability distribution, the more accurately the position of the feature is determined. Thus, for each feature whose positional reliability distribution has been updated, the collection stop unit 44 stops collecting feature data when the extent of the updated reliability distribution is not greater than a threshold related to the extent. More specifically, when the maximum of variance values in respective directions of the variance-covariance matrix representing the updated reliability distribution is not greater than a predetermined variance threshold, the collection stop unit 44 determines that the extent of the reliability distribution is not greater than the threshold related to the extent. The collection stop unit 44 then stops collecting feature data of the feature. Alternatively, when the reliability at the average position defining the updated reliability distribution is not less than a predetermined reliability threshold, the collection stop unit 44 determines that the extent of the reliability distribution is not greater than the threshold related to the extent. The collection stop unit 44 then stops collecting feature data of the feature. By determining whether to stop collecting feature data in this way, the collection stop unit 44 can stop collecting feature data at timing when the position of a feature is accurately determined.

The collection stop unit 44 specifies, as a collection stop region, a predetermined area centered at the average position in the reliability distribution of the position of a feature regarding which it has determined to stop collecting feature data. The collection stop unit 44 generates a collection stop instruction including information indicating the collection stop region, and transmits the generated collection stop instruction to the vehicle 2 via the communication interface 31. In this way, collection of feature data related to features in the collection stop region is stopped.

FIG. 6 schematically illustrates reliability distributions of the positions of features. As illustrated in FIG. 6, for a feature 601, a reliability distribution 611 centered at its average position µ1 is determined. Similarly, for features 602 and 603, reliability distributions 612 and 613 centered at their average positions µ2 and µ3 are determined, respectively. For each reliability distribution, the upper side of FIG. 6 represents the range in which the Mahalanobis distance is not greater than one whereas the lower side of FIG. 6 represents the reliability as a function of position along the lengthwise direction of a road 600.

Regarding the feature 601, the variance value σ1 of the reliability distribution 611 in the lengthwise direction of the road 600 is greater than a variance threshold Thσ. The reliability c1 at the average position µ1 is less than a reliability threshold Thc. Hence collection of feature data of the feature 601 continues.

Regarding the feature 602, the variance value σ2 in any direction of the reliability distribution 612 is equal to or less than the variance threshold Thσ. Hence the position of the feature 602 indicated by the reliability distribution 612 is assumed to be sufficiently reliable. As a result, collection of feature data of the feature 602 is stopped.

Regarding the feature 603, the reliability c3 at the average position µ3 in the reliability distribution 613 is not less than the reliability threshold Thc. Hence the position of the feature 603 indicated by the reliability distribution 613 is assumed to be sufficiently reliable. As a result, collection of feature data of the feature 603 is stopped.

FIG. 7 is an operation flowchart of the feature data collection process in the server 3. The processor 34 of the server 3 executes the feature data collection process in accordance with this operation flowchart at predetermined intervals.

The reception processing unit 42 of the processor 34 stores feature data received from the vehicle 2 in the memory 33 or the storage device 32 (step S101). The update unit 43 of the processor 34 associates a feature represented in the received feature data with one of the features represented in the map, based on the position and the type of the feature indicated by the feature data (step S102). The update unit 43 then updates the reliability distribution of the position of the associated feature, based on the position of the feature indicated by the feature data (step S103).

The collection stop unit 44 of the processor 34 determines whether the extent of the updated reliability distribution is not greater than a predetermined threshold (step S104). When the extent is not greater than the predetermined threshold (Yes in step S104), the collection stop unit 44 generates a collection stop instruction to stop collecting feature data of the feature corresponding to the reliability distribution. The collection stop unit 44 then transmits the collection stop instruction to the vehicle 2 via the communication interface 31 (step S105). Thereafter, the processor 34 terminates the feature data collection process.

When in step S104 the extent of the reliability distribution is greater than the predetermined threshold (No in step S104), the processor 34 determines to continue collecting feature data of the feature corresponding to the reliability distribution. Thereafter, the processor 34 terminates the feature data collection process.

As has been described above, the apparatus for collecting feature data uses a reliability distribution to represent the position of each feature in a collection target area. The apparatus updates the reliability distribution of the position of each feature, using the positions of the feature indicated by feature data received for the feature, and stops collecting feature data for a feature regarding which the extent of the reliability distribution is not greater than a predetermined threshold. In this way, the apparatus can stop collecting feature data for each feature when the reliability of the position of the feature becomes sufficiently high, and thus can appropriately set timing for stopping collecting data representing the feature.

According to a modified example, the data acquisition device 14 may include, in feature data, the distance from the vehicle 2 to the position of a detected feature. The position of a detected feature is supposed to be more reliable as the distance from the vehicle 2 to the position of the feature decreases. Thus, as the distance from the vehicle 2 to the position of a detected feature included in feature data decreases, the update unit 43 increases contribution of the position of the feature indicated by the feature data to update of the reliability distribution of the position of the feature. For example, when updating the reliability distribution by maximum likelihood estimation, the update unit 43 uses weighted positions obtained by multiplying the positions of a feature indicated by individual feature data by a weighting factor for the maximum likelihood estimation. To this end, the update unit 43 increases the weighting factor as the distance from the vehicle 2 to the position of the detected feature decreases. When updating the reliability distribution by Bayesian updating, the update unit 43 raises the rate of increase of reliability of the division including the position of a detected feature as the distance from the vehicle 2 to the position of the feature decreases.

According to this modified example, the apparatus for collecting feature data can update the reliability distribution of the position of the feature more appropriately.

The computer program for causing a computer to achieve the functions of the units included in the processor of the apparatus for collecting feature data according to the embodiment or modified examples may be provided in a form recorded on a computer-readable recording medium. The computer-readable recording medium may be, for example, a magnetic recording medium, an optical recording medium, or a semiconductor memory.

As described above, those skilled in the art may make various modifications according to embodiments within the scope of the present invention.

What is claimed is:

1. A method for collecting feature data, comprising:
storing feature data indicating the position of a feature related to travel of vehicles in a memory whenever receiving the feature data from any of one or more vehicles via a communication circuit capable of communicating with the vehicles;
updating a probability distribution of reliability indicating how likely the feature exists as a function of position, based on the position of the feature indicated by each of one or more pieces of received feature data, the probability distribution being included in map information, wherein the function of the position indicates increasing reliability depending on distance to the feature decreasing;

transmitting an instruction to stop collecting the feature data to the one or more vehicles via the communication circuit when the extent of the updated probability distribution is not greater than a predetermined threshold; and stopping collecting the feature data by a processor mounted on each of the one or more vehicles receiving the instruction to stop collecting the feature data, wherein the probability distribution is expressed as a normal distribution, and wherein the method further comprises at least one of:
   determining, when a variance value in any direction of the updated probability distribution is equal to or less than a predetermined variance threshold, that the extent of the updated probability distribution is not greater than the predetermined threshold, and
   determining, when reliability at an average position in the updated probability distribution is not less than a predetermined reliability threshold, that the extent of the updated probability distribution is not greater than the predetermined threshold.

2. The method according to claim 1, wherein the feature data further includes information indicating the distance between a vehicle of the one or more vehicles that has generated the feature data and the position of the feature indicated by the feature data, and the method further comprises increasing contribution of the feature data to update of the probability distribution as the distance decreases.

* * * * *